United States Patent [19]
Creedon et al.

[11] Patent Number: 5,729,702
[45] Date of Patent: Mar. 17, 1998

[54] MULTI-LEVEL ROUND ROBIN ARBITRATION SYSTEM

[75] Inventors: Tadhg Creedon; Richard A. Gahan; Fearghal Morgan, all of County Galway, Ireland

[73] Assignee: Digital Equipment Corporation, Maynard, Mass.

[21] Appl. No.: 772,782

[22] Filed: Dec. 24, 1996

Related U.S. Application Data

[63] Continuation of Ser. No. 209,852, Mar. 11, 1994, abandoned.

[30] Foreign Application Priority Data

Jun. 21, 1993 [IE] Ireland ................... 930466

[51] Int. Cl.$^6$ ................... G06F 13/14; G06F 13/37
[52] U.S. Cl. ................... 395/291; 395/287; 395/727; 395/731
[58] Field of Search ................... 395/291, 287, 395/727, 729, 731

[56] References Cited

U.S. PATENT DOCUMENTS

| | | | |
|---|---|---|---|
| 4,541,043 | 9/1985 | Ballegeer et al. | 395/650 |
| 4,787,033 | 11/1988 | Bomba et al. | 395/325 |
| 4,814,974 | 3/1989 | Narayanan et al. | 364/200 |
| 5,003,463 | 3/1991 | Coyle et al. | 395/275 |
| 5,280,591 | 1/1994 | Garcia et al. | 395/325 |
| 5,303,382 | 4/1994 | Buch et al. | 395/725 |
| 5,430,848 | 7/1995 | Waggener | 395/303 |

*Primary Examiner*—Jack B. Harvey
*Assistant Examiner*—Jeffrey K. Seto
*Attorney, Agent, or Firm*—Dirk Brinkman; Art Fisher; Michael A. Rodriguez

[57] ABSTRACT

Arbitration means for arbitrating between computer devices A to F which compete for access to a common bus. The system provides cascaded round-robin units. Unit RR1 has ports A, B, C, and X in sequence, with port X coupled to round-robin unit RR2, which has ports D, E, F in sequence. On each cycling of unit RR1 past C to A, unit RR2 is checked and the next one of devices D to F (in the sequence determined by unit RR2) has the opportunity of bus access. A gating circuit 13 can further restrict bus accessing by unit RR2's devices, by timing or counter control. A third round-robin unit can be added coupled to unit RR1 (which would have ports A, B, C, X,Y) or to unit RR2 (which would have ports D, E, F, Y). The assignment of devices to ports can be controllable by a matrix switch and device assignment memory.

19 Claims, 2 Drawing Sheets

MULTI-LEVEL ROUND ROBIN ARBITRATION SYSTEM

This application is a continuation of application Ser. No. 08/209,852, filed Mar. 11, 1994 now abandoned.

The present invention relates to the determination of priority (using the word in a broad sense) or arbitration between competing devices in computer systems.

It is commonplace for a computer system to have several devices which may potentially compete for access to some common or shared resource. A typical example is a system including a system bus over which information (data words and addresses) flows, and which has attached to it a processor, various peripheral devices, and a main memory. The peripheral devices may also be termed DMA (direct memory access) devices, and may for example be communications devices. In this system, the processor and DMA devices will compete for access to the system bus, primarily in order to access the main memory. (The main memory itself will be passive, responding to access requests on the system bus but not initiating any activity itself.) The different DMA (communication) devices may have differing characteristics.

There are various techniques for resolving the possible conflicting demands of the various devices for use of the shared resource.

In some situations, eg in LANs (local area networks), the common resource is the communications channel, and each device monitors the channel so that the device does not interrupt another device which is already using the channel. (If two devices attempt to use the channel simultaneously, both cease their attempted communication and try again later after randomised delays.)

Often, however, there is some arbitration means independent of the resource itself. All the devices are coupled to the arbitration means, and send signals to it when they want to use the resource. The arbitration means then determines how access to the recourse is to be allocated, and returns control signals to the devices accordingly.

There are two main principles which may be used for arbitration: round-robin and graded priority (using the word 'priority' now in a narrower sense). With the round-robin principle, the devices are notionally arranged in a cyclic sequence or loop, and if two or more devices all want to use the resource, access is granted to the first one round the loop from the last device to use the resource. With the graded priority principle, each device is given a different priority, and if two or more devices want to use the resource, access is granted to the device with the highest priority.

The round-robin technique gives equal opportunities to all devices, so that every device has a right of access in turn. Once any device has terminated an access, however, if it wants another access it has to await its turn until all the other devices have had their accesses. The graded priority technique gives priority to some devices over others, so that the devices with higher priorities can hog the resource and devices with lower priorities may have to wait indefinitely long for access.

The choice of which technique to use therefore depends on the nature of the system. For example, different devices may have different latencies; a device with a high latency can wait for a long time for access to the resource without ill effects, while a device with low latency must gain access to the resource quickly or some malfunction, such as the loss of information, will occur.

Obviously, there is scope for variation in the details of the ways that the round-robin and graded priority schemes are implemented. There are also other schemes which are useful in appropriate situations, such as a queuing or first-come-first-served scheme, in which requests from the devices for the resource are stored in the order of their occurrence, and the resource is allocated to the devices in the sequence in which their requests occurred. (This scheme is broadly similar to the round robin scheme.)

Despite that, the choice has broadly to be made between the two basic types of priority scheme, the round-robin scheme and the graded priority scheme. In many instances, neither choice is ideal.

For example, take a communication system in which there are a processor and several communication devices (DMA devices) using a common bus and main memory. The processor should give way to DMA device demands, and this can be achieved by using the graded priority scheme. However, this requires the DMA devices to be ordered as well, and those at the low end of the priority sequence (near the processor) may then be starved of access to the bus. If the round-robin scheme is adopted, the processor has to be included in the round-robin sequence. The processor will acquire access to the bus frequently, and will therefore tend to reset the round-robin sequence to itself, so that the priority assignments for the DMA devices will effectively be biassed towards the graded priority scheme.

Similarly, if the communication system has different types of communication devices which require different types of servicing, this can be satisfied only by adopting a graded priority scheme, with the devices requiring less servicing being given the lower priorities. But this system runs the danger of the lower priority devices being starved of bus access.

The general object of the present invention is to provide a priority scheme which is more flexible than the standard existing schemes.

Accordingly the invention provides arbitration circuitry for a computer system, comprising a first round-robin unit to which a first set of devices are attached, and a second round-robin unit to which a second set of devices are attached, the second round-robin unit being coupled to and treated as a device by the first round-robin unit.

This allows high and low latency devices to share the bus, with the low latency devices having better access to the bus than high latency devices but the high latency devices getting a guaranteed amount of access to the bus. It may be desirable for the devices to have their burst sizes programmed or 'tuned' for good interaction between the devices.

Suppose that the first set of devices consists of 3 devices, A, B, and C, and the second set of devices consists of 3 devices D, E, and F. The first round-robin unit will then select in the cyclic sequence A, B, C, X, where X indicates the second round-robin unit, and the second round-robin unit will select in the cyclic sequence D, E, F. The resulting combined cyclic sequence selected by the two units together will thus be:

ABC-D-ABC-E-ABC-F- where the hyphens are used merely to clarify the structure of the sequence.

It will of course be realised that the sequence just given is the sequence in which the devices will be served if all devices are requesting service. This sequence is in effect the order in which the devices are offered service; if a device which is offered service is not requesting service, the sequence skips past that device and goes on to offer service to the next device in the sequence.

The actual sequence in which the devices are given service may thus, for example, be:

ABC-D-ABC-F-ABC-D-ABC-E-ABC-F- . . .

where it is assumed that devices A, B, and C are continuously requesting service, while the sequence of service requests from devices D, E, and F is

D-F-DEF- . . . .

Because the devices A, B, and C are all continuously requesting service, they receive service in cyclic sequence, with that sequence being interrupted at the appropriate intervals by service to the devices D, E, and F. Looking at these latter devices, device D is the first to request service and the first to receive service. The next of these devices to request service is device F, and this device receives service immediately (ie in the first available gap in the ABC sequence) after device D; this is because device F is the next requesting device in the cyclic sequence DEF following the device D currently being given access.

The devices D, F, and E now request access is rapid succession. Because their requests all appear more or less together, the precise sequence in which they appear is irrelevant; the requests are answered in the order determined by the cyclic sequence D, E, F. These devices are therefore answered in the order D (which follows the current device closest in the cyclic sequence), E (following the previous device D), and F (following the previous device E).

Given the same two sets of devices, an alternative way of achieving a similar result would be this. Take a single round-robin unit with 12 ports, labelled (in sequence) A-B-C-D-A'-B'-C'-E-A"-B"-C"-F-, and couple device A to ports A, A', and A" (and similarly for devices B and C).

This alternative has, however, certain disadvantages compared to the present system. One is that the complexity of round-robin units rises rapidly as the number of ports increases; a 12-port unit is considerably more complicated than a 4-port unit and a 3-port unit. The second is that the service offered to devices D, E, and F is reduced, compared to the present system. Thus while the present system can allow service to F to follow service to D with only a single ABC sequence intervening, as in the sequence

ABC-D-ABC-F-ABC-D-ABC-E-ABC-F- . . .

discussed above, that sequence would become

ABC-D-ABC-ABC-F-ABC-D-ABC-E-ABC-F- . . .

with a single round-robin unit with devices A, B, and C each being coupled to three of its ports.

The present system can be developed (enhanced or elaborated) in various ways.

One development is that more than one second-stage round-robin unit can be coupled to the first-stage unit. The first-stage unit may thus have a sequence of, say, AB-X-C-Y-, where the X sequence cycles through D, E, and F and the Y sequence cycles through say G, H, and I.

Another development is that there can be more than two stages of units. Thus there may be a first-stage unit with a sequence of, say, ABC-X-, a second-stage unit with a sequence of say DEF-Y-, and a third-stage unit with a sequence of GHI.

A further development is that the coupling between the units (the two units, in the simple form of the system) may be 'gated'. This gating may be controlled by a counter which allows the second unit to operate only on say every 3rd cycle of the first unit, so that the sequence becomes

ABC-ABC-ABC-X-.

The gating may alternatively be controlled by a timer, which allows the second unit to operate only during certain periods. The timer may be free-running, or may be reset each time the second unit operates.

A further preferred feature of the present system is that a device priority assignment circuit can be included which can adjust the assignment of the various devices to the various round-robin units and positions thereon.

A computer system requiring arbitration and an arbitrator unit therefor embodying the present invention will now be described, by way of example, with reference to the drawings, in which.

Figure 1:
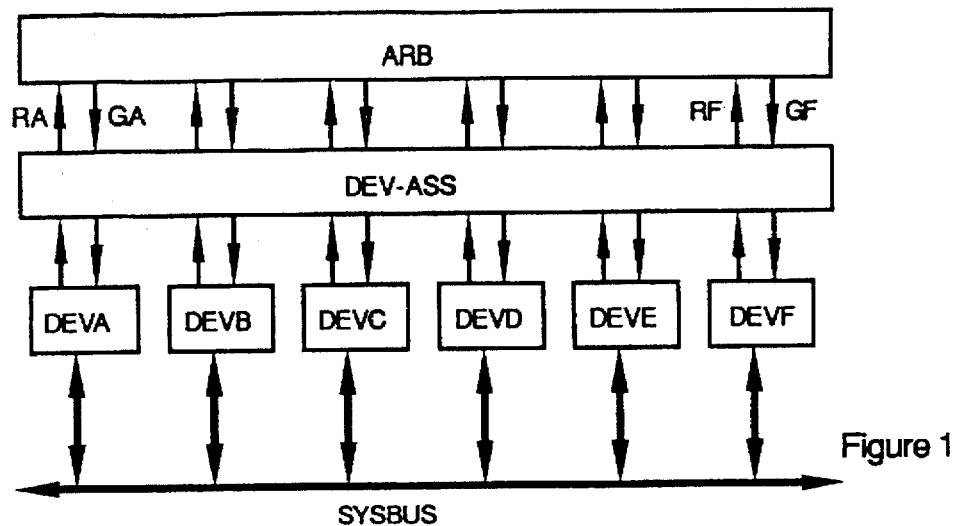
FIG. 1 shows the computer system.

Referring to FIG. 1, the system comprises six devices DEVA to DEVF coupled to a common system bus SYS BUS. These devices may compete for access to the bus. The devices produce respective request signals RA to RF when they want bus access. These request signals are fed to an arbitration unit ARB, which returns corresponding acknowledgement (grant) signals GA to GF to the devices. The arbitration unit sets exactly one of the grant signals true, granting access to the bus to exactly one device at a time.

FIG. 1 is a general diagram for any sort of arbitration unit. If the unit is a round-robin unit, then it will grant access in the cyclic sequence ABCDEF, or whatever modification of that sequence results from omitting devices which are not requesting bus access. For the moment, the block DEV-ASS should be ignored and it should be assumed that each device is coupled directly to the corresponding port of the arbitration unit ARB.

Figure 2:
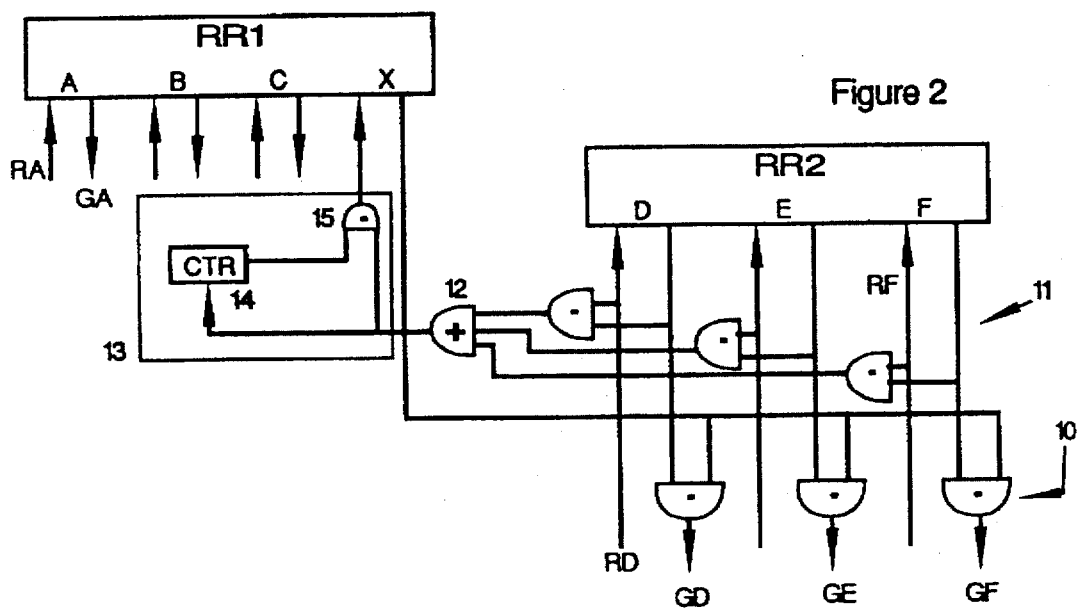
FIG. 2 shows a form of the present arbitrator for that FIG. 1 system.

FIG. 2 shows the details of the arbitration unit ARB for this system embodying the present system. The unit consists of two round-robin units RR1 and RR2. Unit RR1 has three ports A to C with the devices DEVA to DEVC coupled to them in the conventional way, and also has a fourth port X; unit RR2 has three ports D to F.

For each of the ports D to F, the output from the round-robin unit passes through a respective one of a set of AND gates 10 to generate the grant signal for the respective device; the gates 10 are enabled by the output of the port X of unit RR1. The request signals to the ports D to F of unit RR2 are ANDed with the outputs from those ports by a set of three AND gates 11, the outputs of which are combined in an OR gate 12 to generate the input to port X of unit RR1.

Unit RR2 receives its request signals RD to RF in the usual way, and produces a pre-grant output signal from the appropriate port in accordance with its cyclic sequence. Assume that at least one of the devices DEVD to DEVF is requesting bus access. The request signal from the currently chosen device is therefore ANDed with the pre-grant signal to that device to generate a true signal from one of the AND gates 11. This true signal passes through gate 12 to the request input of port X of unit RR1. (Block 13 in the connection from gate 12 to the X port of unit RR1 should be ignored for the moment.)

Unit RR1 cycles through the sequence ABCX. Since we are assuming that at least one of devices DEVD to DEVF is requesting bus access, signal RX will be true, and unit RR1 will therefore return signal GX as true in due course. This signal enables the AND gates 10, and therefore allows the pre-grant signal from unit RR2 to pass through and become the grant signal to the appropriate device.

In due course, that device (one of DEVD to DEVF) will end its bus access, and its request signal will therefore go false. This will result in the request signal RX going false. Unit RR1 will therefore continue round its cycle, to devices A, B, and C. Unit RR2, in the meantime, will proceed round its cycle, to whichever of its requesting devices is next in cycle to be served, and issue the appropriate pre-grant signal. That will be combined with the corresponding request signal by the gates 11 and 12 to restore the request signal RX to unit RR1. However, unit RR1 will have moved on in its cycle, so unit RR2 will then remain quiescent until unit RR1 reaches port X again in its cycling.

Obviously, if at any stage none of the devices DEVD to DEVF are requesting bus access, then signal RX will remain low, unit RR1 will skip past port X in its cycling, and unit RR2 will remain quiescent (remembering which of its devices it has reached in its cycling) until one of its devices requests bus access.

The system thus grants bus access to the devices DEVA to DEVC in cyclic sequence, offering the opportunity of bus access to the devices DEVD to DEVF in cyclic sequence each time the ABC sequence cycles past C. Since the two round-robin units operate largely in parallel, the system can respond to requests within a single clock cycle, even when the sequence is changing from one of devices DEVA to DEVC to one of devices DEVD to DEVF (or back again). The bus is therefore fully utilised (unless all the devices happen to be idle, ie not requesting bus access).

The effect of block 13 can now be considered. This block is shown as comprising a counter 14, fed from gate 12, which enables a gate 15, included between gate 12 and the input to port X of unit RR1. The counter 14 is a cyclic counter, and gate 15 is enabled each time the counter cycles. Thus the rate at which requests from devices DEVD to DEVF are responded to is reduced by the count size of the counter.

Block 13 may be modified by driving the counter by a signal (not shown) from unit RR1 instead of the signal from gate 12, so that the counter steps on each time unit RR1 cycles past gate X. This results in the response rate to devices DEVD to DEVF being controlled more by the activity of devices DEVA to DEVC than by the activity of devices DEVD to DEVF themselves.

Block 13 may instead be modified by replacing the counter by a timer. The timer may be free-running, enabling and disabling gate 15 regularly. Alternatively, the timer may be reset eg each time the output signal GX goes true; it may either be free-running (to disable and then enable gate 15 regularly after resetting) or one-shot (to hold gate 15 disabled for a given time after resetting).

Figure 3:
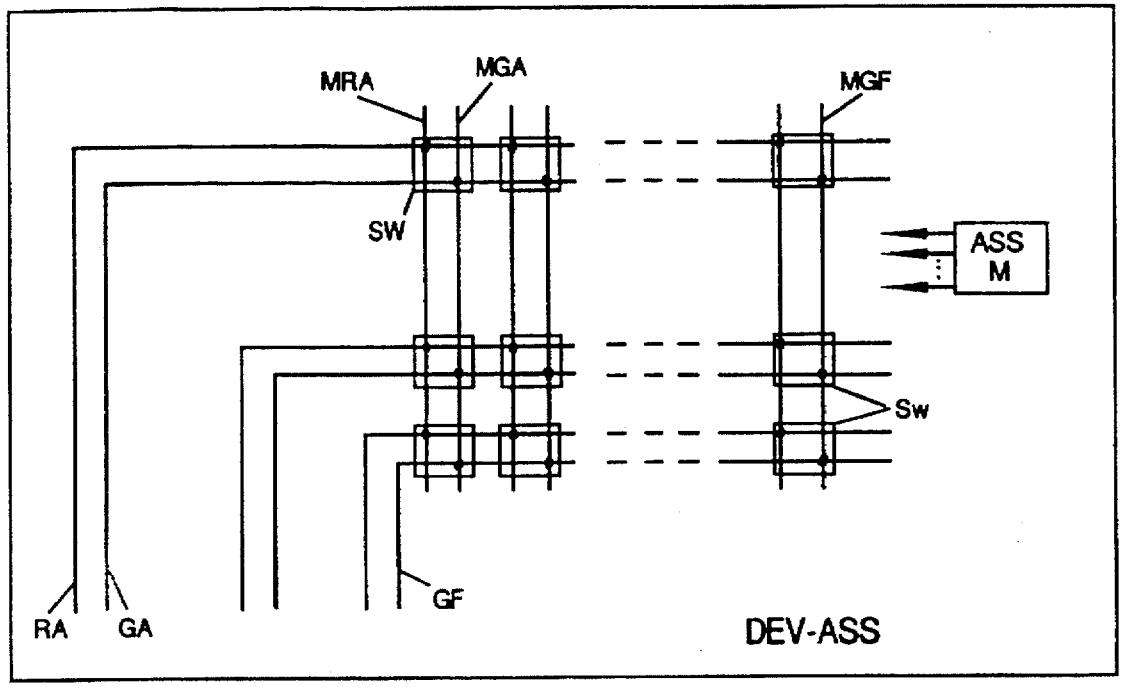
FIG. 3 shows the device assignment block of the present system in more detail.

Turning now to the device assignment block DEV-ASS of FIG. 1, this is shown in more detail in FIG. 3. The request and grant lines RA, GA, etc of the devices DEVA, etc are converted by this block into modified request and grant lines MRA, MGA, etc of the ports of the arbitration unit ARB. The pairs of lines RA–GA, etc of the devices and the pair of modified lines MRA, MGA etc of the arbitrator ports are arranged in a matrix, with switch pairs SW at the intersections of the rows and columns. A device assignment memory ASS M controls the switch pairs SW, closing one switch pair in each row and column of the matrix.

The device assignment memory is set to couple the devices to the ports of the two round-robin units in accordance with the characteristics of the various devices. Thus, if the ideal logical arrangement of the devices is as shown but their physical sequence is different, the device assignment memory would be set to achieve a logical re-arrangement of the devices. In particular, the device assignment unit permits the devices to be assigned to each of the two round-robin units in dependence on their characteristics; in the extreme, it allows all devices to be assigned to the same round-robin unit if they all have similar characteristics.

The setting of the device assignment memory may be changeable, and may be driven on the identities of the devices (as indicated eg by their burnt-in electronic identifiers). Thus the numbers of devices attached to the two round-robin units can be changed, and a device can be moved from one round-robin unit to the other if the characteristics of the device are changed.

The system has been shown as a pair of round-robin units, a device assignment unit, and some peripheral logic. It will be realised, however, that in practice the internal circuitry of the two round-robin units and the peripheral logic can in general be combined into a unitary logic system, which performs the same overall functions as the circuitry shown.

The two round-robin units, in particular, can be regarded as state machines, with the interactions between the round-robin sequences included in the state machines. (A state machine is circuitry comprising a set of flip-flops and some combinative logic circuitry. The flip-flops implement a set of system 'states', and the combinative logic circuitry implements a set of transitions between those states under the control of external conditions (input signals).) In principle, the entire arbitration unit may be regarded as a single state machine, but it will generally be easier to divide it into two state machines corresponding generally to the two round-robin units.

We claim:

1. An arbiter for a computer system, comprising:
   a first round-robin unit;
   a second round-robin unit having a device coupled thereto, the device issuing a bus access request to the second round-robin unit, the second round-robin unit issuing a grant signal to the device in response to the bus access request; and
   logic circuitry, coupled to the round-robin units, issuing a request signal to the first round-robin unit in response to the bus access request issued by the device and the grant signal issued by the second round-robin unit.

2. The arbiter according to claim 1, further comprising:
   a third round-robin unit coupled to said second round-robin unit as a single device.

3. The arbiter according to claim 1, further comprising:
   gating circuitry, coupled to the logic circuitry, controlling when the request signal issued to the first round-robin unit by the logic circuitry is presented to the first round-robin unit.

4. The arbiter according to claim 3, wherein the second round-robin unit is coupled to the first round-robin unit via said gating circuitry.

5. The arbiter according to claim 3, wherein the gating circuitry comprises a counter, said counter enabling the request signal issued by the logic circuitry to be presented to said first round-robin unit when said counter has a predetermined value.

6. The arbiter according to claim 5, wherein the request signal issued by the logic circuitry increments the counter of the gating circuitry.

7. The arbiter according to claim 5, wherein an operation of the first round-robin unit increments the counter of the gating circuitry.

8. The arbiter according to claim 3, wherein the gating circuitry comprises a timer, the timer enabling the request signal issued by the logic circuitry to be presented to the first round-robin unit during a predetermined time interval.

9. The arbiter according to claim 8, wherein the timer is reset when a grant signal is generated by said first round-robin unit in response to the request signal issued by the logic circuitry.

10. The arbiter according to claim 8, wherein the timer is cyclic.

11. The arbiter according to claim 8, wherein the timer is non-cyclic.

12. The arbiter according to claim 1, further comprising:
   a device priority assignment means for defining an assignment of the device to a first port of the second round-robin unit.

13. The arbiter according to claim 12, wherein the device priority assignment means can change the assignment of the device to a second port of one of said round-robin units.

14. The arbiter as in claim 13, wherein said first port has a higher priority than said second port.

15. The arbiter according to claim 1, wherein the grant signal issued by the second round-robin unit is a first pre-grant signal, the logic circuitry is a first logic circuitry, the first round-robin unit issues a second pre-grant signal in response to receiving the request signal issued by the first logic circuitry; and further comprising:
   a second logic circuitry issuing a grant signal to the device in response to the first and second pre-grant signals.

16. An arbiter for a computer system, comprising:
   a first round-robin unit;
   a second round-robin unit having devices coupled thereto, the devices issuing bus access requests to the second round-robin unit, the second round-robin unit selecting a particular one of the devices issuing a bus access request and issuing a grant signal to the particular device; and
   logic circuitry, coupled to the round-robin units, issuing a request signal to the first round-robin unit in response to the bus access request issued by the selected particular device and the grant signal issued by the second round-robin unit.

17. In a computer system comprising a first and second round-robin units coupled to a system bus, a method for arbitrating access to the system bus, comprising the steps of:
   issuing a bus access request to the second round-robin unit;
   selecting a device that issued the bus access request;
   issuing a pre-grant signal to the selected device in response to the bus access request; and
   issuing a request signal to the first round-robin unit in response to the bus access request and the pre-grant signal.

18. The method according to claim 17 further comprising the step of:
   gating the request signal issued to the first round-robin unit to control when the issued request signal can be presented to the first round-robin unit.

19. The method according to claim 18 further comprising the steps of:
   receiving the issued request signal;
   selecting the second round-robin unit;
   issuing a first grant signal to the selected second round-robin unit in response to the issued request signal; and
   providing a second grant signal, in response to the pre-grant signal and the first grant signal, to the selected device that issued the bus access request.

* * * * *